Patented May 18, 1948

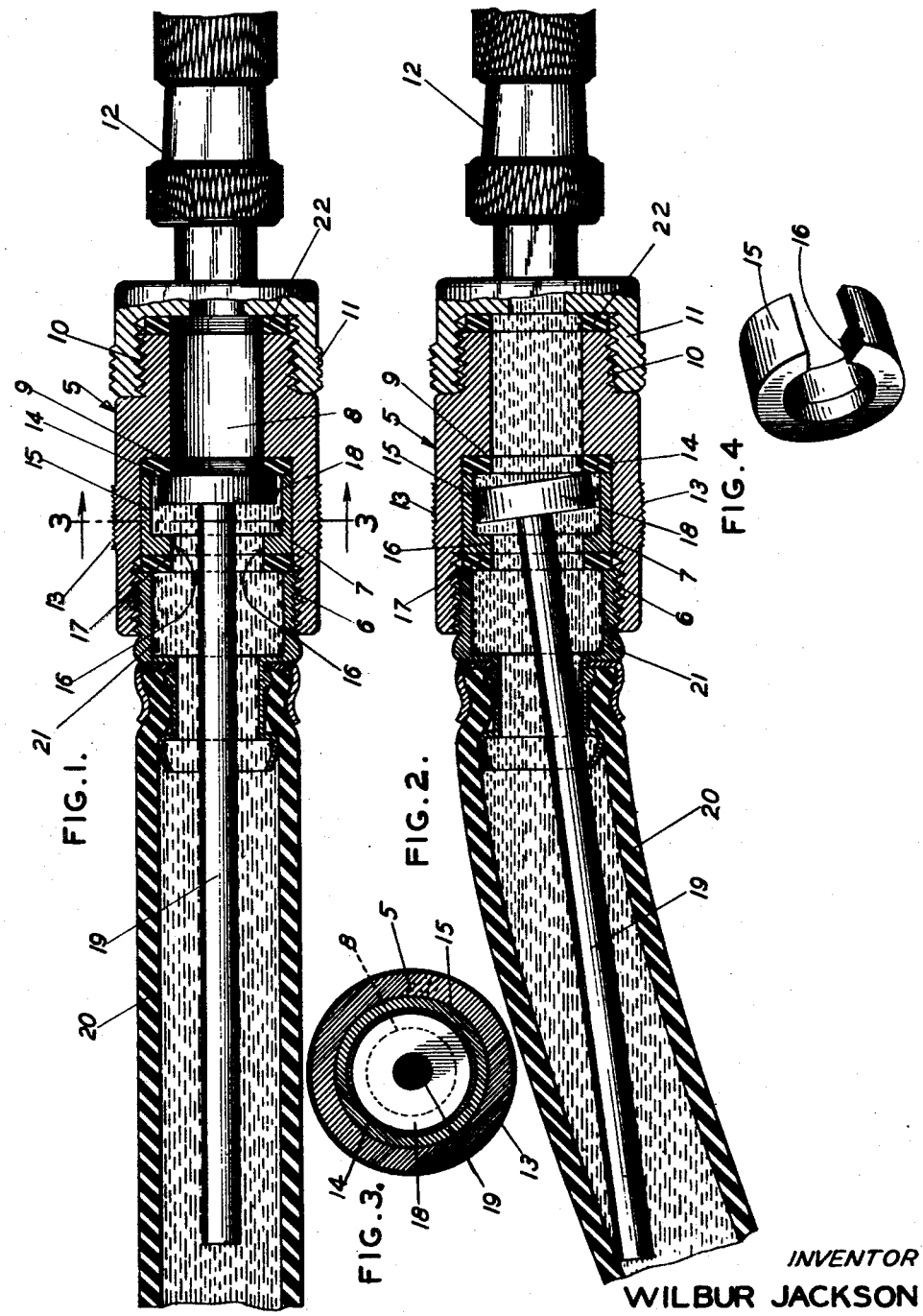

2,441,704

UNITED STATES PATENT OFFICE 2,441,704

VALVE DEVICE FOR USE WITH FLEXIBLE HOSE

Wilbur Jackson, Chatsworth, Ga.

Application February 26, 1947, Serial No. 731,118

2 Claims. (Cl. 251—115)

My invention relates to a valve device for use with a flexible hose.

An important object of the invention is to provide a device which will effect a great saving of water when used with a conventional garden hose.

A further object of the invention is to provide a valve device for use with a hose, and particularly adapted to be used in automobile service stations, for washing cars, and resulting in saving much water.

A further object is to provide a valve device for use with a flexible hose to automatically stop the flow of water therefrom, when the hose is dropped to the floor by the user.

A further object is to provide a valve device which will permit the water to flow from the hose as long as the hose is slightly bent adjacent to the valve device.

A further object is to provide a device of the above mentioned character designed for use with the standard adjustable garden hose nozzle.

A further object is to provide a valve device of the above mentioned character, which is maintained closed by water pressure, when the hose is substantially straight, and which has novel means to prevent the device from leaking while in use.

A still further object of the invention is to provide a device of the above mentioned character which is simple and practical, extremely durable, and inexpensive to manufacture.

Other objects and advantages of the invention will be apparent during the course of the following description.

In the accompanying drawings, forming a part of this application, and in which like numerals are employed to designate like parts throughout the same, Figure 1 is a central vertical longitudinal section through the valve device, showing the same in use with a conventional garden hose and standard nozzle; the valve being shown in the closed position, parts in elevation, Figure 2 is a similar section showing the hose bent and the valve in the open position, Figure 3 is a vertical transverse section taken on line 3—3 of Figure 1, and, Figure 4 is a perspective view of a sealing sleeve, part in section.

In the drawings, where for the purpose of illustration, is shown a preferred embodiment of my invention, the numeral 5 designates a cylindrical tubular valve body or coupling, preferably formed of some non-corrosive metal. This coupling 5 has a central axial internally screw-threaded opening 6 formed in its rear end, and the screw threaded opening 6 leads into a smooth axial cylindrical bore or chamber 7. The diameter of the chamber 7 is substantially equal to the inside diameter of the screw threaded opening 6, and the two openings are concentric. The cylindrical bore or chamber 7 leads into a smaller cylindrical opening or discharge passage 8, extending through the forward end of the coupling 5. An annular shoulder 9 is formed by the junction of the discharge passage 8 and the chamber 7. The forward end of the coupling 5 is externally screw threaded, as shown at 10, and this screw thread is of the proper size for engagement within the internally screw threaded portion 11 of any standard adjustable garden hose nozzle 12. The outside diameter of the coupling 5 is substantially the same as the outside diameter of the portion 11 of the nozzle, and forms with the portion 11 a handle or gripping surface. The outside diameter of the coupling 5 may be knurled to facilitate holding the hose, and this is shown at 13.

Arranged within the cylindrical chamber 7, and seated against the annular shoulder 9, is an annular rubber washer 14. Also disposed within the chamber 7 is an annular sealing sleeve 15, the forward annular end of which is adapted to engage against the rubber washer 14, to prevent the valve device from leaking. The sealing sleeve 15 has a rear annular portion or shoulder 16, formed integral therewith. A rear rubber washer 17 is disposed within the scew threaded opening 6, and engages against the annular shoulder 16. The numeral 18 designates a flat cylindrical valve disc or element having a rearwardly longitudinally extending stem 19, rigidly secured thereto. This stem 19 is preferably between four and five inches in length and is rigid and straight. The valve element 18 is freely disposed within the sealing sleeve 15, and is adapted to be seated against the rear surface of the annular rubber washer 14 by water pressure in the standard garden hose 20. The outside diameter of the valve element 18 is larger than the inside diameter of the annular shoulder 16, and this shoulder 16 prevents the valve element 18 and stem 19 from falling rearwardly into the hose 20. The garden hose 20 has the usual externally screw threaded ferrule 21, and the ferrule 21 engages within the screw threaded opening 6 of the coupling 5. The forward end of the ferrule 21 engages against the rear annular rubber washer 17, and compresses this washer, as well as the forward washer 14, to effect the sealing of the valve device against leakage. An annular rubber washer 22 may also be employed between the nozzle 12 and coupling 5, to prevent leakage.

When the hose 20 is in use, such as for washing an automobile at a service station, it may be desirable to turn on the water and leave it on all day. If this is done, and the user of the hose fails to turn off the adjustable nozzle 12 each time he drops the hose to the floor to wipe down a car, a great deal of water will be wasted during the course of a day. A careless attendant will often fail to turn off the nozzle, or the water, and simply drop the hose while the water is flowing, thereby wasting the water. The valve device embodying this invention has for its primary object the saving of this water.

The operation of the device is as follows:

When the water is turned on, and the hose is in use, such hose will normally be bent to some extent adjacent to the coupling 5, see Figure 2. This bending of the hose causes a lateral or swinging movement of the valve stem 19 which extends rearwardly into the hose; and the valve disc or element 18 is tilted and unseated, see Figure 2. When this occurs the passage 8 is in communication with the hose 20, and water will flow from the nozzle 12. If the hose is dropped on the floor it will become straightened, at least for an instant, and the pressure exerted by the flowing water will cause the valve element 18 to be seated against the annular washer 14 and completely stop the flow of water from the nozzle 12. No water will flow from the hose until it is again picked up, at which time the bending of the hose will again occur, and the flow of water will start.

It is to be understood that the form of my invention herewith shown and described is to be taken as a preferred example of the same, and that various changes in the shape, size, and arrangement of parts may be resorted to, without departing from the spirit of my invention or the scope of the subjoined claims.

Having thus described my invention, what I claim is:

1. A valve device for use with a flexible hose, comprising a coupling which is externally screw threaded at its forward end and which has an internally screw threaded opening near its rear end, a cylindrical chamber having its rear end open, and a discharge passage forming a shoulder and extending forwardly of said chamber, a washer disposed within the cylindrical chamber and engaging against the shoulder, a sleeve disposed within the cylindrical chamber and engaging against the washer, a rear washer arranged within the internally screw threaded opening and engaging against the rear of the sleeve, the internally screw threaded opening being adapted to receive a screw threaded ferrule carried by a flexible hose, the ferrule engaging the rear washer, and a valve element disposed within the sleeve and adapted to be seated against the first named washer and free to be tilted and unseated and including a rearwardly extending rigid stem.

2. A valve device for use with a flexible hose, comprising a coupling which is externally screw threaded at its forward end for connection with a standard garden hose nozzle and having an internally screw threaded opening at its rear end, a cylindrical chamber having its rear end open, and a discharge passage forming an annular shoulder and extending forwardly of said chamber, a washer disposed within the cylindrical chamber and engaging against the shoulder, an annular sleeve disposed within the cylindrical chamber and having its forward annular end engaging against the washer and including a rear annular shoulder, a rear washer disposed within the internally screw threaded opening and engaging against the rear annular shoulder, the internally screw threaded opening being adapted to receive a screw threaded ferrule carried by a flexible hose, the ferrule engaging the rear washer, and a valve disc disposed within the sleeve and free to move therein and adapted to be seated against the first named washer and having a rearwardly longitudinally extending stem projecting into the garden hose to be moved when the garden hose is bent to unseat the valve disc.

WILBUR JACKSON.

REFERENCES CITED

The following references are of record in the file of this patent:

UNITED STATES PATENTS

| Number | Name | Date |
|---|---|---|
| 1,864,978 | Cottrell | June 28, 1932 |
| 2,015,923 | Davis | Oct. 1, 1935 |
| 2,149,584 | Davis | Mar. 7, 1939 |
| 2,157,881 | Andraesen | May 9, 1939 |
| 2,322,139 | Kaelin | June 15, 1943 |